Oct. 31, 1967  H. D. WILSON  3,350,238
METHOD OF BINDING BATTERY ELEMENTS TO CONTAINER
Filed June 26, 1964

HARLAND D. WILSON
INVENTOR
BY John R. Faulkner
Thomas H. Oster
ATTORNEYS

United States Patent Office 3,350,238
Patented Oct. 31, 1967

3,350,238
METHOD OF BINDING BATTERY ELEMENTS TO CONTAINER
Harland D. Wilson, Toledo, Ohio, assignor to Ford Motor Company, Dearborn, Mich., a corporation of Delaware
Filed June 26, 1964, Ser. No. 378,107
3 Claims. (Cl. 136—176)

This invention relates to secondary storage batteries, more particularly to a means for cementing the lower edges of the plates and separators to the bridges at the bottom of the battery container whereby the fully assembled battery is held together as an integral unit. This invention is an improvement over that described and claimed in United States Patent 2,934,582 issued Apr. 26, 1960 and owned by the assignees of this invention.

In the past, particularly with the so-called "off the road" vehicles such as tractors, trucks and the like, which are subjected to very severe vibration and/or shock due to the conditions under which they are used, such as very rough terrain, the batteries used in connection with the operation of these vehicles have suffered excessive damage due to such vibration and shock and by attrition of the elements of the battery arising from the rubbing together of adjoining surfaces by slight movement during the vibration or shock. The life expectancy of the batteries has been materially shortened by the damage to their component parts, which may consist of loosening and loss of electrical capacity of positive and/or negative active materials, abrasive erosion of the separators or notching of the bottoms of the separators by repeated impingement on the bridges and consequent disorientation resulting in eventual short circuit of the positive and negative plates through treeing or mechanical contact, of various other types of damage such as seal rupture, lead burn and bushing failure, and plate breakage.

The present invention contemplates a method of permanently affixing both the pasted plates, positive and negative, and the separators to closely juxtaposed container surfaces such as the upper surface of the spaced bridges located at the bottom of the container, to hold the battery elements rigidly in place to prevent movement of the parts during severe vibration or shock. The invention further contemplates a method of attaining these ends, which is suitable for application to the production of batteries on a mass production line.

It is, therefore, a principal object of this invention to provide a means whereby the plates and separators comprising the elements of a battery cell may be permanently affixed to the container of the battery to form an integral unit.

It is a further object of this invention to provide a method whereby the plates and separators comprising the elements of a battery cell may be permanently affixed to the container for the cell.

It is a further object of this invention to provide a means, and a method for providing the means for affixing the plates and separators of a battery cell to its container which is suitable for application to a mass production line.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
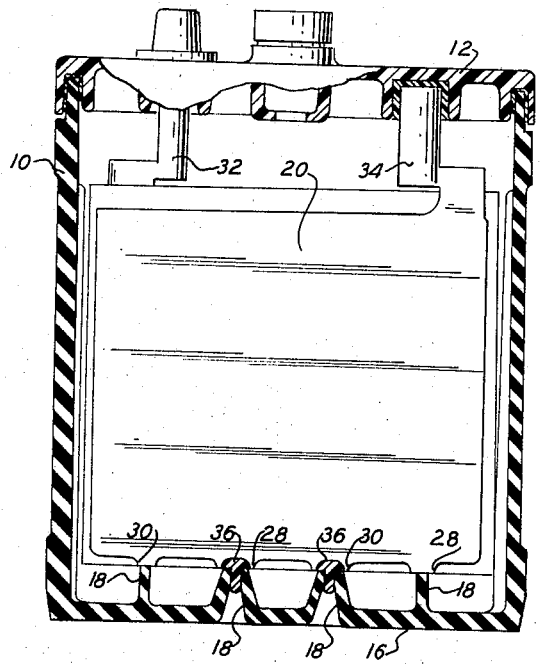
FIGURE 1 is a sectional elevation of a battery cell to which the invention has been applied.

Referring now to the drawings, particularly to FIGURE 1, a battery is shown, to which the invention has been applied. The battery consists of a conventional box or container 10, having a suitable cover 12 sealed therein as is well known in the art. The floor 16 of the box is provided with the usual bridges or electrode rests 18 which spaces the bottom edges of the plates of the battery element 20 from the floor 16 and provides room for the sediment to collect. The battery element 20 is made in the usual manner, comprising positive and negative plates separated by insulating elements or separators which preferably are made of artificial cellulosic material, although they may be made of cedar wood or other suitable materials if desired. The negative plates are provided with feet 28 which rest on one pair of the bridges, while the positive plates have similar feet 30 to rest on the other alternate pair of bridges. The plates, both positive and negative, are burned to common post straps at their upper ends which are provided with terminal posts 32 and 34 which extend through the cover in the well known manner. The construction of the battery is conventional and may vary considerably in detail.

In the past, the battery element 20 has been placed in operative position in the box 10, and blocks or shims (not shown), usually consisting of parts of separators, were placed between the sides of the outer negative plates and the adjacent side of the box to hold the element tightly in the box. This was not completely satisfactory for the purpose of preventing limited movement of the whole element 20 with reference to the box or relative movement between the portions making up the battery element viz, the positive and negative plates and the separators. Either the fit was not perfect or sizing of the materials forming the construction occurred resulting in loss of compression and would still allow some movement of the element or its parts. The present invention solves this problem by integrally bonding the feet 28 and 30 of the plates and also the adjacent portions of the separators to the top of the bridges 18, so that the element 20 and its component parts are permanently affixed to the box 10 at their top and bottom portions, by the post straps 32 and 34 at the top of the element and by the integral bonding to the bridges at the bottom.

The integral bond at the bottom is provided by bodies of bonding material 36, preferably positioned between the feet 28 and 30 on the plates and the upper surface of the bridges 18, the body being so positioned that the material flows up between the adjacent elements and contacts the lower edge of the plates. An interlock is formed, which is mechanical as well as an adhesive integral bond with the plates, the separators and the bridges. The bonding material is applied as a viscous body which conforms itself to the contour of the element, as shown, and adheres to them to form the integral bond which, when hardened or set, becomes a rigid bonding body to hold the parts permanently together. It will be noted that the body of bonding material does not materially reduce the openings between the plates and the separators at their bottom edges to thereby reduce the facility with which the battery electrolyte may circulate through the interstices between the plates and the separators. If the circulation of the electrolyte is hampered, the efficiency and performance of the battery is seriously reduced.

The bonding material 36 is a compound which is resistant to chemical attack in the battery system, is innocuous to the chemical system of the battery, is a nonconductor of electricity, and is capable of being hardened or set-up into a strong and rigid body which will firmly adhere to the parts to be integrally bonded. The preferred materials are the thermosetting resins of the epoxy, furfural or phenolic types. These resins are available commercially.

A preferred resin among the epoxy type of resins is commercially available under the trade name Bisonite G5–54–B and accelerator G5–54–C made by The Bisonite Company of Buffalo, N.Y. This resin is of a thermosetting liquid epoxy casting resin having a specific gravity of approximately 1.20 which can be cured or hardened with the addition of a suitable curing agent, and the optional application of moderate heat. This resin has the further advantage that it will cure when submerged in the electrolyte of the battery, which, therefore, permits the immediate addition of the electrolyte to the battery cell in a production line, without having to wait for the resin to cure under other conditions.

These resins and their properties are described in the following publications: "Modern Plastics," volume 33, No. 8 (April 1926) pages 125 and 174; "Synthetic Resins & Applied Plastics" by R. S. Morrell, Chapter 1, Oxford University Press, 1943 (second edition); "Plastics" by H. R. Fleck, Chapter 1, Chemical Publishing Company, Inc., Brooklyn, N.Y., 1945; "Polymer Progress," Shell Chemical Corporation, No. 1, April 1955, "The Chemistry of Epoxy Resins." Generally speaking, a suitable epoxy resin may be produced as a condensation product of epichlorohydrin and bisphenol-A with different grades of products being obtained depending on the mol ratio of epichlorohydrin to bisphenol-A and/or the conditions of the reaction. The epoxy resin thus obtained is cured or hardened to form the bond between the element and the container by the reaction with a curing agent such as diethylene triamine and the optional use of moderate heat.

Although the invention has been described for use with thermosetting resin of the epoxy, furfural and phenolic types, either natural or artificial resins of the thermoplastic type and various adhesive materials may also be used, including adhesives having a tar or asphaltic base, providing the bonding materials have the characteristics set out above.

Figure 2:
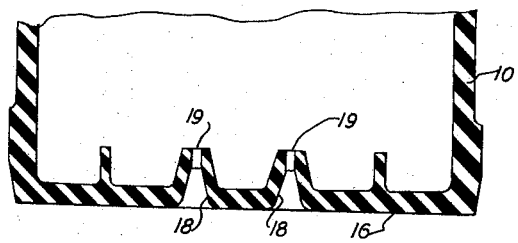
FIGURE 2 is a partial cross section of a battery box employed in the fabrication of the structure shown in FIGURE 1.

The structure shown in FIGURE 1 is best produced by placing a battery element 20 in box or container 10 and then inverting the assembly. FIGURE 2 clearly shows that the two central bridges 18 are hollow and provided with openings 19. It is preferred that these openings 19 take the form of a slot running essentially the entire length of the bridges 18 which are in contact with battery element 20.

With the assembly of the element 20 and the box or container 10 in the inverted position, firm contact is established between feet 28 and 30 and bridges 18. When such contact has been established, bonding material 36 is forced into and through the openings 19 as shown in FIGURE 1. The assembly is held in this position until the bonding material has set either through the application of heat or the passage of sufficient time. This bonding material 36 firmly secures the element 20 and the box 10 into a rigid unit and seals the openings 19 against leakage of acid.

I claim as my invention:

1. The method of affixing an assembly of battery cell elements including positive and negative plates and separators to closely juxtaposed wall portions of a container comprising assembling the battery cell elements and the container with the container in the inverted position and forcing a liquid, viscous, acid resistant and hardenable bonding material through openings in the container to seal such openings and affix such positive and negative plates and separators to the container.

2. The method of affixing an assembly of battery cell elements including positive and negative plates and separators to closely juxtaposed bottom wall portions of a container, said container being provided with a plurality of bridges for the support of said plates, comprising assembling the battery cell elements and the container in final relationship and forcing a liquid, viscous, acid resistant and hardenable bonding material through openings in at least a portion of said bridges to seal such openings and affix such positive and negative plates and separators to the container.

3. The method of affixing an assembly of battery cell elements including positive and negative plates and separators to closely juxtaposed bottom wall portions of a container, said container being provided with a plurality of bridges for the support of said plates, comprising assembling the battery cell elements and the container in final relationship with the container in the inverted position and forcing a liquid, viscous, acid resistant and hardenable bonding material through openings in at least a portion of said bridges to seal such openings and affix such positive and negative plates and separators to the container.

References Cited

UNITED STATES PATENTS

| | | | |
|---|---|---|---|
| 2,637,758 | 5/1953 | Shannon | 136—170 X |
| 2,931,849 | 4/1960 | Burrell | 136—175 |
| 2,934,582 | 4/1960 | Wilson | 136—166 X |
| 3,059,283 | 10/1962 | Budovec et al. | 264—261 |
| 3,224,076 | 12/1965 | Johnson et al. | 264—261 |

WINSTON A. DOUGLAS, *Primary Examiner.*

D. L. WALTON, *Assistant Examiner.*